US007062511B1

(12) United States Patent
Poulsen

(10) Patent No.: US 7,062,511 B1
(45) Date of Patent: Jun. 13, 2006

(54) METHOD AND SYSTEM FOR PORTAL WEB SITE GENERATION

(75) Inventor: Thomas J. Poulsen, Los Gatos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 420 days.

(21) Appl. No.: 10/040,031

(22) Filed: Dec. 31, 2001

(51) Int. Cl.
*G06F 17/30* (2006.01)

(52) U.S. Cl. ...................... 707/104.1; 707/10; 709/221; 715/513

(58) Field of Classification Search ..................... 707/1, 707/3, 9, 100, 101, 10, 104.1; 709/204, 222, 709/223, 221; 715/503, 509, 513
See application file for complete search history.

(56) References Cited

U.S. PATENT DOCUMENTS

| | | | | |
|---|---|---|---|---|
| 4,817,043 A | | 3/1989 | Brown | |
| 4,974,170 A | | 11/1990 | Bouve et al. | |
| 5,237,157 A | | 8/1993 | Kaplan | |
| 5,649,186 A | | 7/1997 | Ferguson | |
| 5,764,226 A | | 6/1998 | Consolatti et al. | |
| 5,765,142 A | | 6/1998 | Allred et al. | |
| 5,826,267 A | | 10/1998 | McMillan | |
| 5,897,649 A | | 4/1999 | Kennedy | |
| 5,983,227 A | | 11/1999 | Nazem et al. | |
| 6,014,137 A | | 1/2000 | Burns | |
| 6,029,182 A | | 2/2000 | Nehab et al. | |
| 6,230,196 B1 | * | 5/2001 | Guenthner et al. | 709/223 |
| 6,275,833 B1 | * | 8/2001 | Nakamura et al. | 715/513 |
| 6,327,628 B1 | * | 12/2001 | Anuff et al. | 707/9 |
| 6,341,310 B1 | * | 1/2002 | Leshem et al. | 709/223 |
| 6,424,979 B1 | | 7/2002 | Livingston et al. | |
| 6,460,040 B1 | | 10/2002 | Burns | |
| 6,587,668 B1 | | 7/2003 | Miller et al. | |
| 6,701,343 B1 | * | 3/2004 | Kenyon | 709/204 |
| 6,766,362 B1 | | 7/2004 | Miyasaka et al. | |

(Continued)

OTHER PUBLICATIONS

Guang, Y. et al. "Driving the Citizen–Oriented Information on the Electronic Highway" *Proceedings of the International Conference on Multimedia Computing and Systems*, Washington, D.C., USA (May 15–18, 1995), pp. 131–138.

Healy, P. "Wish You Were Here" *Which Computer*? (Aug. 1994) 17(8)40–41.

Holfelder, W. and D. Hehmann "Networked Multimedia Retrieval Management System for Distributed Kiosk Applications" *Proceedings of the International Conference on Multimedia Computing and Systems*, Boston, Massachusetts, USA (May 14–19, 1994) pp. 342–351.

Kearsley, G. and R.S. Heller, "Multimedia in Public Access Settings: Evaluation Issues" *J. Educational Multimedia and Hypermedia* (1995) 4(1):3–24.

(Continued)

*Primary Examiner*—Shahid Al Alam
(74) *Attorney, Agent, or Firm*—Bingham McCutchen LLP

(57) ABSTRACT

A portal web site development system for generating portal web sites. A portal web site development system includes a router, a login server, a database, and a portal web server. Preference data is collected from a user regarding the appearance and operation of a portal web site. Based upon the preference data, the portal web site development system generates a new portal web site accessible to an identified set of users. The portal web site is generated entirely within the database. The user may specify the appearance and operation of the portal web site prior to generation, and may customize the portal web site anytime thereafter.

26 Claims, 16 Drawing Sheets

START
200 — POPULATE SEED DATA WITHIN THE PORTAL SCHEMA
210 — COLLECT USER PREFERENCE DATA
220 — GENERATE A PORTAL WEB SITE BASED UPON THE PREFERENCE DATA
230 — TRANSMIT NOTIFICATION TO THE ADMINISTRATOR THAT THE PORTAL WEB SITE IS GENERATED
END

U.S. PATENT DOCUMENTS

| | | | | |
|---|---|---|---|---|
| 2001/0025309 | A1 | 9/2001 | Macleod Beck et al. | |
| 2001/0034609 | A1 | 10/2001 | Dovolis | |
| 2001/0034771 | A1 | 10/2001 | Hütsch et al. | |
| 2001/0056398 | A1 | 12/2001 | Scheirer | |
| 2002/0001649 | A1 | 1/2002 | Lowry et al. | |
| 2002/0010709 | A1 * | 1/2002 | Culbert et al. | 715/500 |
| 2002/0030741 | A1 | 3/2002 | Broemmelsiek | |
| 2002/0036950 | A1 | 3/2002 | Cosman et al. | |
| 2002/0049727 | A1 | 4/2002 | Rothkopf | |
| 2002/0065802 | A1 | 5/2002 | Uchiyama | |
| 2002/0069083 | A1 | 6/2002 | Harter et al. | |
| 2002/0095368 | A1 | 7/2002 | Tran | |
| 2002/0103777 | A1 | 8/2002 | Zhang | |
| 2002/0103822 | A1 * | 8/2002 | Miller | 715/501.1 |
| 2002/0123957 | A1 | 9/2002 | Notarius et al. | |
| 2002/0133250 | A1 | 9/2002 | Kopcha | |
| 2002/0152279 | A1 | 10/2002 | Sollenberger et al. | |
| 2002/0178031 | A1 | 11/2002 | Sorensen et al. | |
| 2003/0084343 | A1 | 5/2003 | Ramachandran et al. | |
| 2003/0115292 | A1 | 6/2003 | Griffin et al. | |
| 2003/0126558 | A1 | 7/2003 | Griffin | |
| 2003/0135393 | A1 | 7/2003 | Burgess | |
| 2003/0145275 | A1 | 7/2003 | Qian et al. | |
| 2003/0158508 | A1 | 8/2003 | DiGianfillippo et al. | |
| 2004/0015476 | A1 * | 1/2004 | Twaddle | 707/1 |
| 2004/0068477 | A1 * | 4/2004 | Gilmour et al. | 707/1 |
| 2004/0205555 | A1 | 10/2004 | Hind et al. | |

OTHER PUBLICATIONS

Maloney, J.H. and R.B. Smith "Directness and Liveness in the Morphic User Interface Construction Environment" *Proceedings of the 1995 8th Annual Symposium on User Interface Software and Technology* (UIST '95), Pittsburgh, Pennsylvania, USA (Nov. 14–17, 1995) pp. 21–28.

Martinez, C.D. "All That Jazz" *Presentations* (Jun. 1994) pp. 44–50.

Steiger, P. and B.A. Suter "Minnelli–Experiences with an Interactive Information Kiosk for Casual Users" *Computer Science Research at UBILAB–Stragegy and Projects*, W.R. Bischofberger, H.–P. Frei (eds.), *Proceedings of the UBILAB Conference* '94, Zurich, Switzerland (1994) pp. 124–133.

Oracle Corporation "Oracle9iAS Portal Developer Kit (PDK)" http://portalstudio.oracle.com/pls/ops/docs/folder/community/pdk/articles/overview.portlets.html (Oct. 31, 2001) pp. 1–6.

Oracle Corporation "Oracle9iAS Portal, Feature Overview" http://portalstudio.oracle.com/pls/ops/docs/folder/community/otn_content/mainpage/keyfeatures_benefits/portal_FOV.html (May 2002) pp. 1–7.

Oracle Corporation "Oracle Application Server 10g, Oracle AS Portal" http://portalstudio.oracle.com/pls/ops/docs/folder/community/otn_contant/mainpage/keyfeatures_benefits/portal_FOV_0.html (Sep. 2003) pp. 1–9.

Oracle Corporation "Oracle Application Server Portal Overview" (Sep. 2003) pp. 1–4.

Oracle Corporation "Creating and Managing Sites–Task Help" (Oct. 1999) pp. 111–197.

Oracle Corporation "Oracle8i™ Release 2 New Features Summary" (Nov. 1999) 17 pgs.

Oracle Corporation "Oracle Application Server Portal 10g (9.0.4) Product Overview, An Oracle White Paper" (Sep. 2003) pp. 1–9.

Oracle Corporation "Oracle9iAS Portal Release 2–Technical Overview; An Oracle White Paper" (Apr. 2002) pp. 1–30.

Oracle Corporation "Oracle9iAS Portal Release 2 (Version 9.0.2): New Features; An Oracle White Paper" (May 2002) pp. 1–34.

* cited by examiner

ORACLE

Portal Online

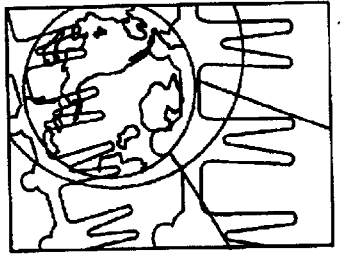

Home Sign Up! About Us Help/FAQ

Contact Us Login

Overview | Identity and Account | Contact Info | Site Setup | Site Themes | Business Info | Team Member

Identity

* First Name John
* Last Name Doe
* Company Acme
* Title Manager
* Email jdoe@acme.com ☒ Yes, I would like to recieve informational email.

Admin Account

* Secret Question What is my mother's maiden name? ▾
* Your Answer Smith

Cancel Back --step 2 of 9-- Next Finish

FIG. 4B

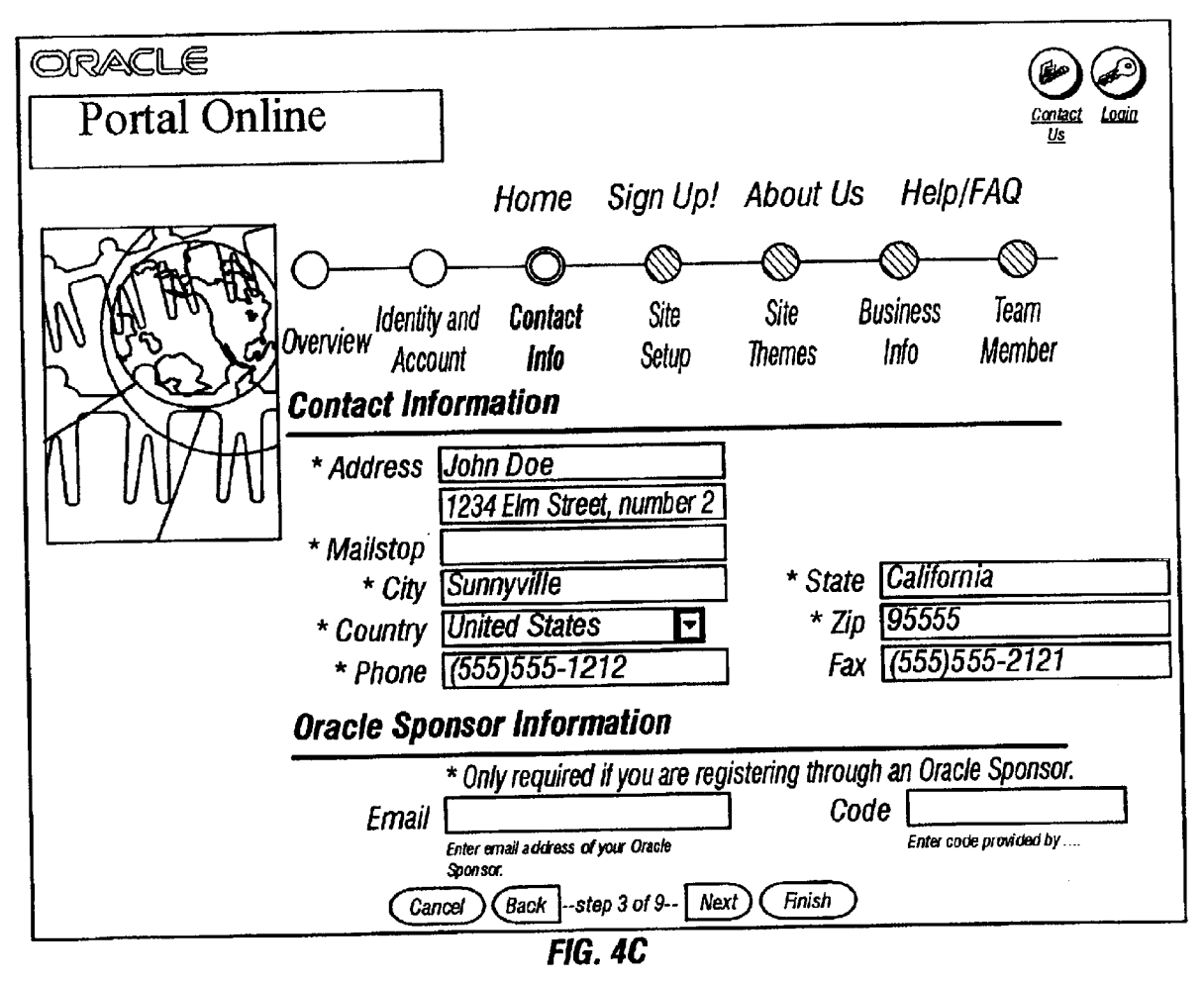

ORACLE
Portal Online

Home Sign Up! About Us Help/FAQ

Contact Us Login

Overview Identity and Account Contact Info Site Setup Site Themes Business Info Team Member

Contact Information

* Address John Doe
1234 Elm Street, number 2
* Mailstop
* City Sunnyville
* Country United States
* Phone (555)555-1212
* State California
* Zip 95555
Fax (555)555-2121

Oracle Sponsor Information

* Only required if you are registering through an Oracle Sponsor.

Email
Enter email address of your Oracle Sponsor.

Code
Enter code provided by ....

Cancel Back --step 3 of 9-- Next Finish

FIG. 4C

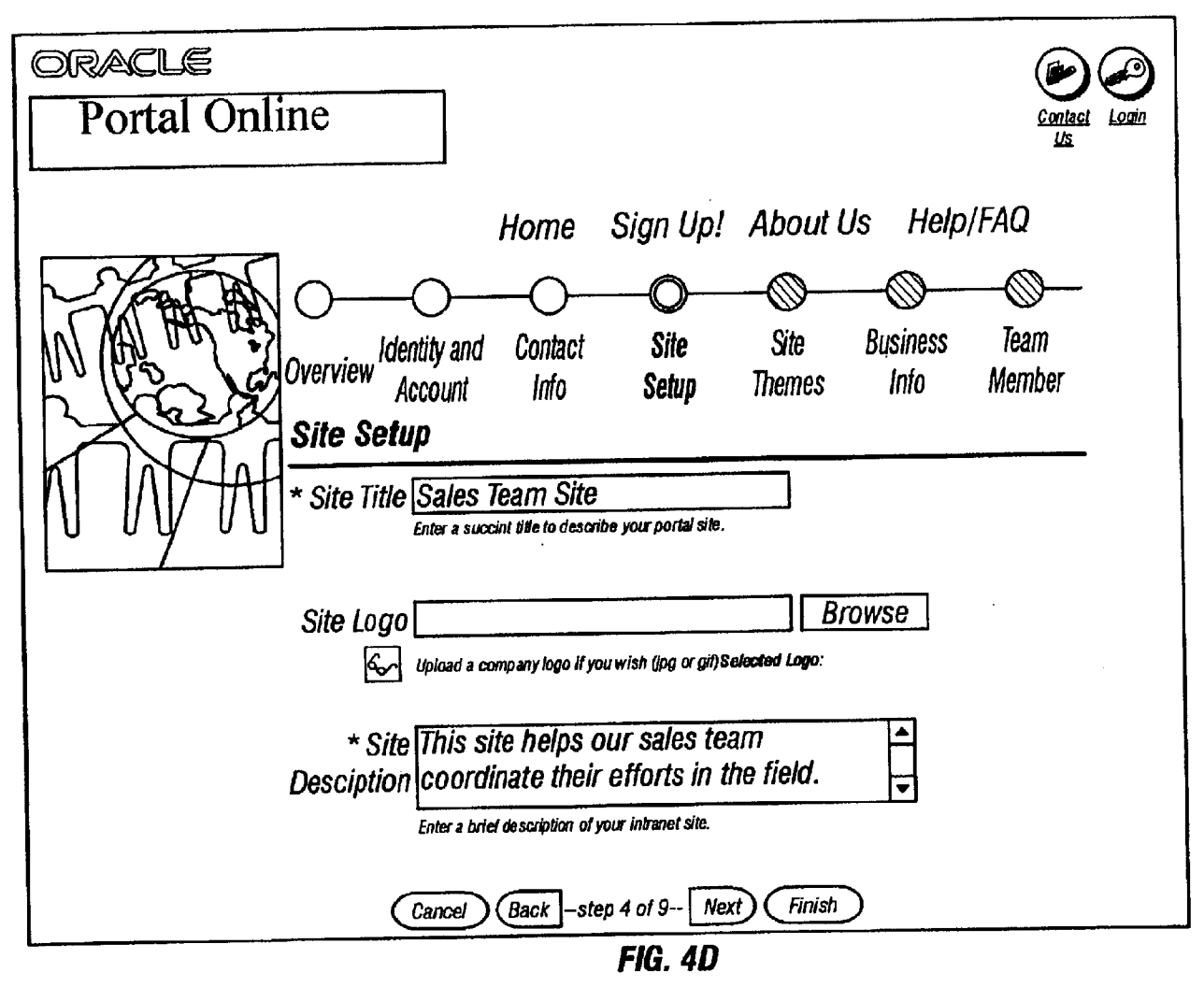

ORACLE

Portal Online

Home Sign Up! About Us Help/FAQ

Contact Us Login

Overview Identity and Account Contact Info Site Setup Site Themes Business Info Team Member

Site Setup

* Site Title Sales Team Site

Enter a succint title to describe your portal site.

Site Logo Browse

Upload a company logo if you wish (jpg or gif) Selected Logo:

* Site Descpition This site helps our sales team coordinate their efforts in the field.

Enter a brief description of your intranet site.

Cancel Back --step 4 of 9-- Next Finish

FIG. 4D

METHOD AND SYSTEM FOR PORTAL WEB SITE GENERATION

COPYRIGHT NOTICE

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The invention generally relates to the field of web sites, and more particularly towards the field of portal web sites.

BACKGROUND AND SUMMARY OF THE INVENTION

Generally, a web site is an arrangement of content, e.g., text, images, and sound, on a set of web pages configured for presentation over a computer network in a predetermined way. The content appearing on a web page is generally stored in a centralized location, such as, e.g., a database or a set of files. Requests for web pages are processed by a web server, which is a server that transmits web pages in response to HTTP requests from web browsers. Centralizing the storage of the web content found on web pages facilitates its transmission by the web server because the web content is in a known location that is readily available.

Web sites have become more complex as their application has spread. Web sites have proven to be a valuable means of communication both with the public (e.g., a corporate web site) and in private use (i.e., an Intranet site). In either case, it is advantageous to display content with as much breadth and depth as possible to maximize the utility of the web site to its users. However, as web content becomes more complex and diverse, the amount of time, money, and effort in obtaining, storing, and updating the web content increases.

More recently, portal web sites have been used to deliver complex and diverse content over a computer network. A portal web site is a web site containing one or more portlets displayed on a web page. A portlet is a configurable content area displayable on a web page that provides content or performs one or more associated functions. Portlets may display content that is obtained from sources external to the web server. For example, a portal web site may use an arrangement of portlets to display web content on different subject areas. The web content for each of the subject areas need not be stored centrally, but rather may be stored in a plurality of locations accessible to the portlet. Each portlet is configured such that it may display the information it obtains to the web browser.

An existing problem with this approach is that developing portal web sites still requires a significant investment of time, money, and effort. This is due, in part, to the cost of supporting the hardware and software necessary to support a portal web site and the computer specialists required to manage the portal web site. Further, constructing a portal web site from scratch is a time and labor intensive process. These associated costs often prohibit those without significant resources from building or using a portal web site. Unfortunately, there is no current solution in the art to create and deploy portal web sites without incurring these costs.

Accordingly, the present invention provides an improved method and system for portal web site generation. In an embodiment of the present invention, preference data is collected from a user of the portal web site. The preference data identifies a set of user preferences about the appearance and operation of a portal web site. The preference data is stored, and a portal web site is generated based upon the preference data. In an embodiment, the portal web site is generated entirely within the database. In another embodiment, seed data, which is data that identifies an initial appearance and operation of the portal web site, may be stored. Seed data may be used to efficiently store the preference data. Further details of aspects, objects, and advantages of the invention are described below in the detailed description, drawings, and claims.

BREIF DESCRIPTION OF DRAWINGS(S)

The present invention is illustrated by way of example, and not by way of limitation, in the figures of the accompanying drawings and in which like reference numerals refer to similar elements and in which:

FIGS. 3A–3C are portal schema tables illustrating seed data according to embodiments of the invention;

FIGS. 4A–4I are pictorial representations of graphical user interfaces for collecting preference data according to embodiments of the present invention;

DETAILED DESCRIPTION OF EMBODIMENT (S)

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A user, as used within, refers to any person using a portal web site. A user will access a portal web site through a web browser. An administrator, as used herein, refers to any user who manages a portal web site. An administrator may have greater access privileges to the portal web site. Specifically, a user may only have sufficient access to change the portal web site for himself (the change is local to the particular user), whereas an administrator may be able to modify the configuration of the portal web site for all users, as well as add new users. A portal web site will be associated with a set of users, at least one of which is an administrator.

Figure 1:
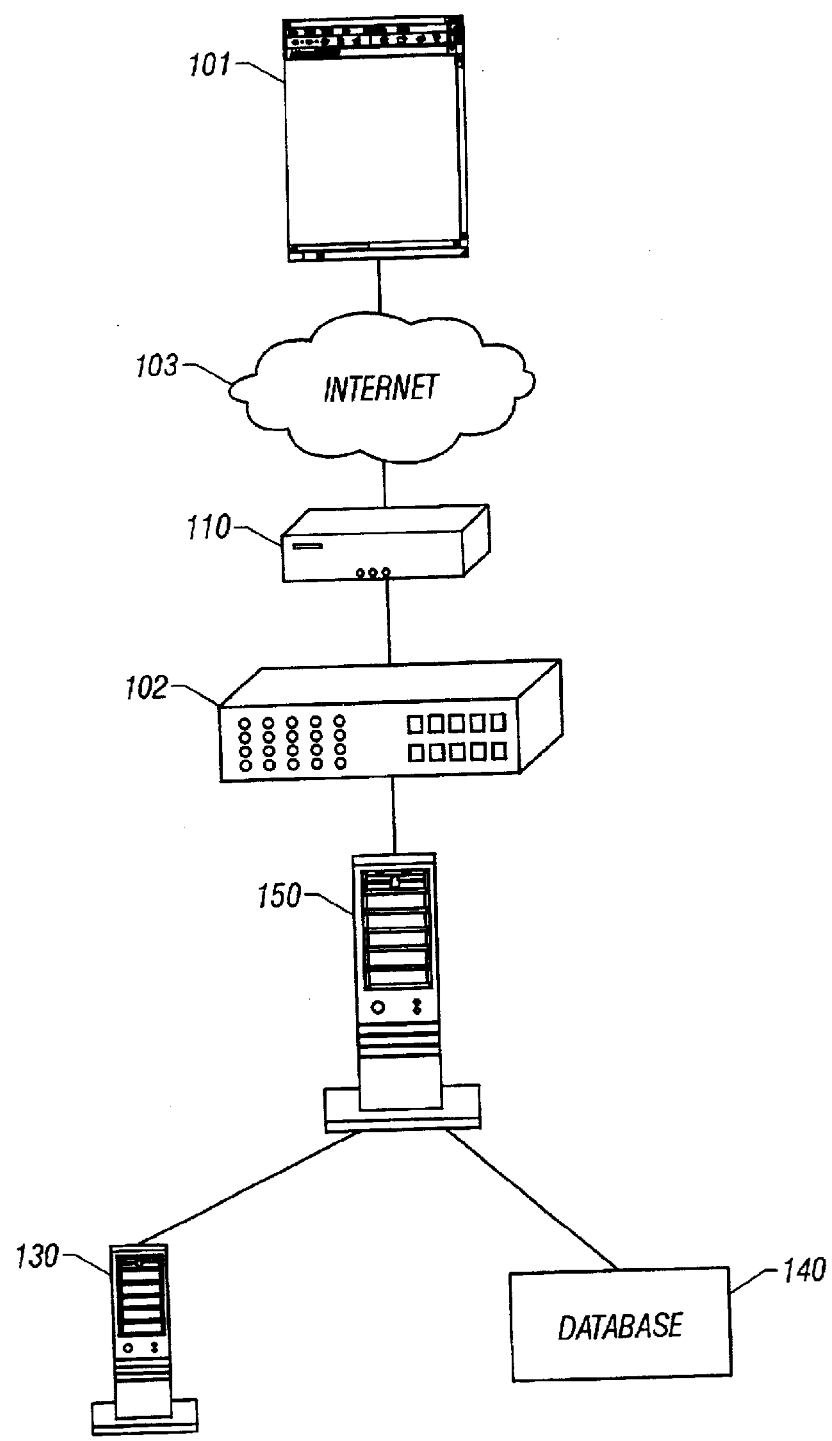
FIG. 1 is a pictorial representation illustrating the functional components of a portal web site development system 100 according to an embodiment of the invention.

FIG. 1 is a pictorial representation illustrating the functional components of a portal web site development system 100 according to an embodiment of the invention. According to an embodiment of the invention, the portal web site development system 100 allows a user to dynamically generate a portal web site. The portal web site development system 100 includes a router 110, a login server 130, a portal database 140, and a portal web server 150. Also depicted in FIG. 1 is a web browser 101, a firewall 102, and the Internet 103. A web browser 101 is any device capable of browsing content on the Internet. A firewall 102 is a well understood security system that prevents unauthorized users from gaining access to a computer network. The Internet 103 is a well understood interconnected system of computer networks that connect computers around the world via the TCP/IP protocol.

The router 110 is a standard piece of equipment for routing digital communication, such as TCP/IP packets. The router 110 is in data communication with the portal web server 150. Communication received over the Internet 103 by the router 110 is then routed to the appropriate destination, e.g., the login server 130 or the portal database 140, via the portal web server 150. In some embodiments of the invention, the portal web server 150 may reside behind the firewall 102, as shown in FIG. 1. In other words, data packets originating from the Internet 103, received by the router 110, and consequently routed to the portal web server 150 by the router 110 may pass through a firewall 102 before being passed on to their destination.

The login server 130 is a software component as well as a database that authenticates communication from users. The login server 130 authenticates communication from users by consulting information it has stored about the set of authenticated users. The login server 130 is operatively connected to the portal web server 150, and communicates with the portal database 140 via HTTP requests. While only one login server 130 is depicted in FIG. 1, some embodiments of the invention deploy multiple login servers 130. Such an embodiment may be advantageous for scaling to a large number of users. Accordingly, the invention is not limited by the number of login servers 130 deployed.

The portal database 140 is a standard software component for storing data, and includes the plurality of databases known to those in the art, such as, e.g., the Oracle 8i database, available from Oracle Corporation, located in Redwood Shores, Calif. The portal database 140 is operatively connected to the portal web server 150, and communicates with the login server 130 via HTTP requests. For ease of explanation, the portal database 140 and the login server 130 that are operatively connected to the portal web server 150 shall be assumed to be separate and singled databases. However, this need not be the case, and it should be understood to those in the art that for performance and security reasons, the data stored in these databases may be stored in a variety of arrangements, e.g., data may be stored in the same database or multiple databases. In other words, the portal web server 150 may be coupled to multiple portal databases 140 and multiple login servers 130. Thus, the invention is not limited to any particular arrangement of databases. Further, embodiments of the invention include the use of backup or failover discs, such as a RAID arrangement, to promote uninterrupted operability of the portal database 140 and login server 130.

The portal web server 150 is a software component for servicing requests for content on a portal web page via the HTTP protocol. The portal web server 150 is operatively connected to the portal database 140 and the login server 130. In servicing the portal web content request, the portal web server 150 may contact the login server 130 or the portal database 140 to obtain data needed to process the request, as explained in further detail below. In response to portal web content requests, the portal web server transmits portal web content information to the requesting user, which typically is received by a web browser 101 associated with that user. The portal web page is subsequently rendered by the requesting user's display device, such as a web browser 101.

A request for web content may be initiated by a user through a web browser 101 associated with the user. The request may be transmitted via the Internet 103 to the router 110. The router 110 routes data packets to the portal web server 150. If the user has not been authenticated yet, the portal database 140 may contact the login server 130 via HTTP requests, brokered by the portal web server 150, to authenticate the user making the request. The login server 130 may respond to the portal database 140 authentication query via HTTP, brokered by the web server 150. If the user is not authenticated, then the web browser 101 may communicate back to the user that the user is not authenticated by rendering an appropriate web page. These web pages may be generated by the portal database 140, and passed back to the user through the portal web server 150, and then on to the user's web browser 101 to be rendered.

Figure 2:
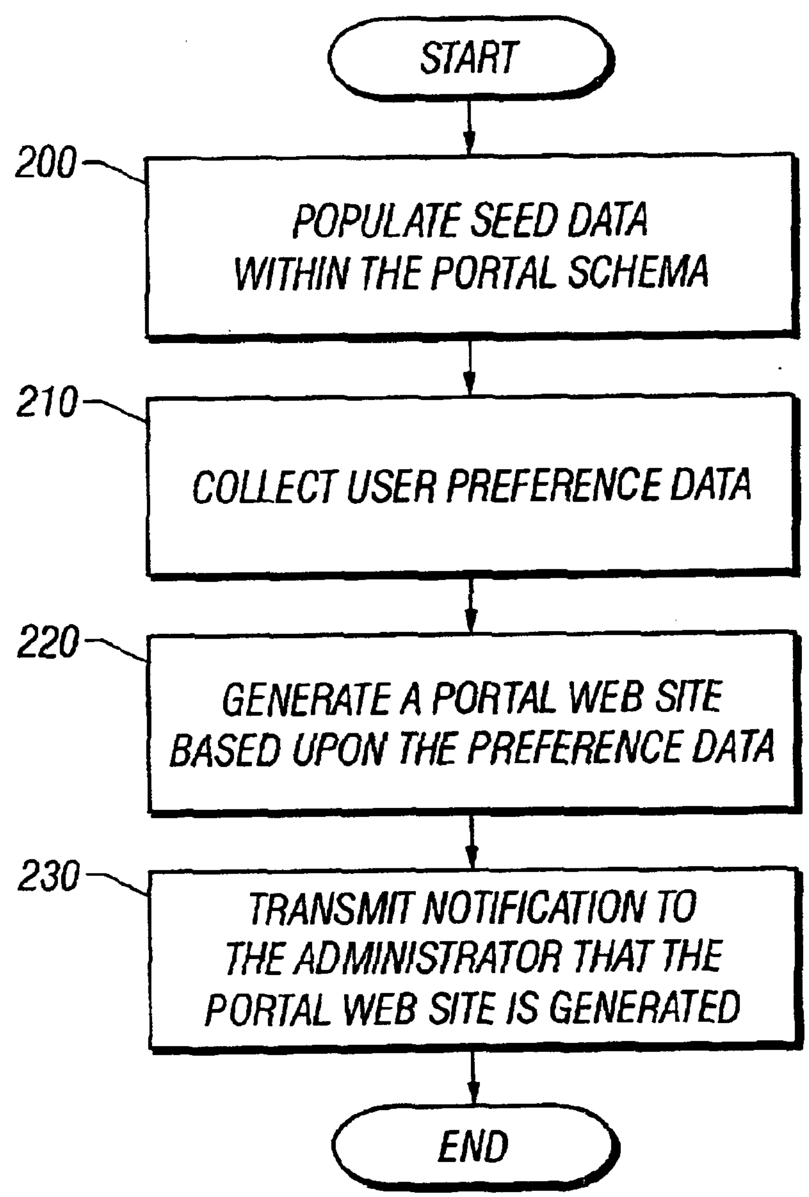
FIG. 2 is a flowchart illustrating the functional steps performed by the portal web site development system 100 according to an embodiment of the invention.

FIG. 2 is a flowchart illustrating the functional steps of developing a portal web site using the portal web site development system 100 according to an embodiment of the invention. In an embodiment, the first step performed is to populate seed data within the portal schema 200. Seed data is data that identifies an initial appearance and operation of a portal web site. Illustrative non-limiting examples of seed data includes data defining the color choice and layout of a web portal site, the particular set of portlets appearing on a portal web site, the particular arrangement of portlets on the portal web site, and information concerning the set of users and administrators authorized to access the portal web site. Seed data is stored within a portal schema. A portal schema is a set of database tables that store information about the appearance and operation of one or more portal web sites. The portal schema is stored in the portal database 140.

The composition of the seed data may change from embodiment to embodiment. In other words, the data required to identify an initial appearance and operation of a portal web site may change based upon a number of factors, including, e.g., the complexity of the portal web site, the level of specificity desired in designing the look and feel of the portal web site, and performance considerations. Accordingly, the invention is not limited by any particular composition of seed data.

Figures 3A, 3B, 3C:
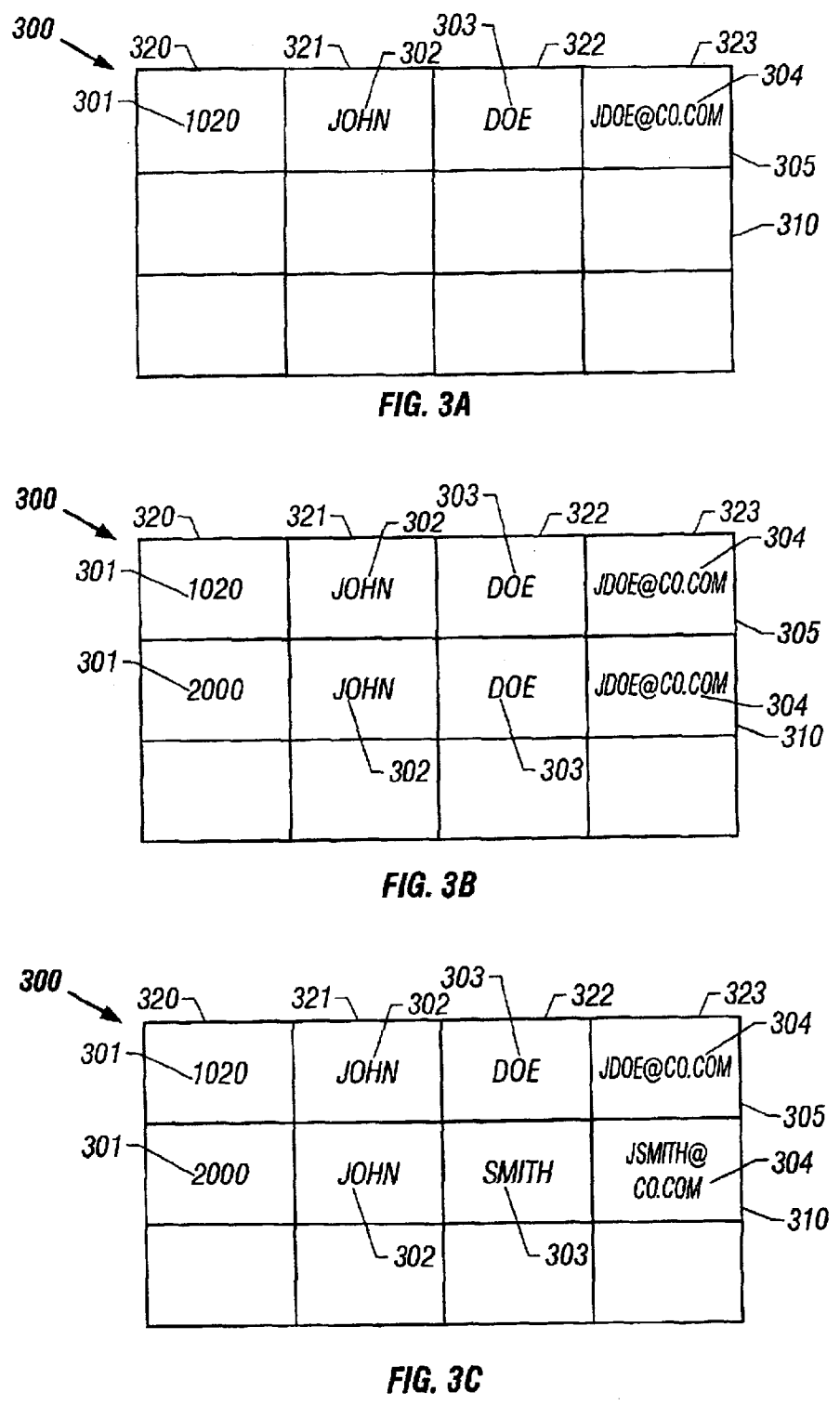

An example of seed data residing within a portal schema table is illustrated in FIG. 3A, which is an illustrative portal schema table showing a partial list of the seed data stored therein. As illustrated in FIG. 3A, the seed data in table 300 includes a subscriber id 301, and information about the administrator of the portal web site, such as administrator first name 302, administrator last name 303, and administrator email address 304. The subscriber id 301 is a unique identifier associated with each portal web site. In other words, a portal web site may be uniquely identified using the subscriber id 301. The administrator first name 302, administrator last name 303, and administrator email address 304 each identifies a piece of information about the administrator of the portal web site, specifically, the administrator's first name, last name, and email address respectively.

In embodiments of the invention, the portal schema stores information about multiple portal web sites using the same portal schema. Access is restricted to the portal schema such that users may only access information pertinent to their associated portal web site. In some embodiments, this is performed using a Virtual Private Database ("VPD"), which is a feature of the Oracle 8i database available from Oracle Corporation, located in Redwood Shores, Calif. This feature is described in patent application Ser. No. 09/167,092, filed on Oct. 5, 1998, and in patent application Ser. No. 09/812,896, filed on May 31, 2001, each of which is assigned to the assignee of the present application and is hereby incorporated by reference. Other embodiments of the invention may perform the function of restricting access to rows in a database table by user by a variety of other methods, such as, e.g., using a database view or the use of a session table. In order to prevent unnecessarily obscuring the description of the present invention, embodiments of the invention shall store information about one or more portal web sites on the portal schema, but will restrict access such that a user may only access information stored on the portal schema pertinent to the user's portal web site. Embodiments of the invention may use any of the aforementioned mechanisms to restrict access on the portal schema using the subscriber id 301, which is a unique identifier for each portal web site.

In an embodiment, with reference to FIG. 2, the next step performed is to collect user preference data 210. In this step, a user of the portal web site development system 100 defines preferences about a portal web site that is desired to be generated. Preference data is a set of data identifying a set of user preferences about the appearance and operation of the portal web site. Preference data may be collected by a variety of means by the portal web site development system 100. For example, preference data may be received by the portal web server 150 via a variety of means, such as, e.g., a comma delimited file or preference data may be received through a graphical user interface. In embodiments of the invention, the person submitting the preference data may be assumed to be an administrator of the portal web site. In other embodiments of the invention, the administrator may be identified later, and the submitter of the preference data is not an administrator, but a user of the portal web site.

FIGS. 4A–4I are pictorial representations of graphical user interfaces for collecting preference data according to an embodiment of the present invention. The graphical user interfaces depicted in FIGS. 4A–4I are web pages. As such, data may be transferred from the web pages to the portal web server 150 via the Internet 103 using standard protocols. Preference data collected in FIGS. 4A–4I may be submitted to the portal web server 150 at any time, e.g., after each web page is filled out or after all web pages are filled out.

Figure 4A:
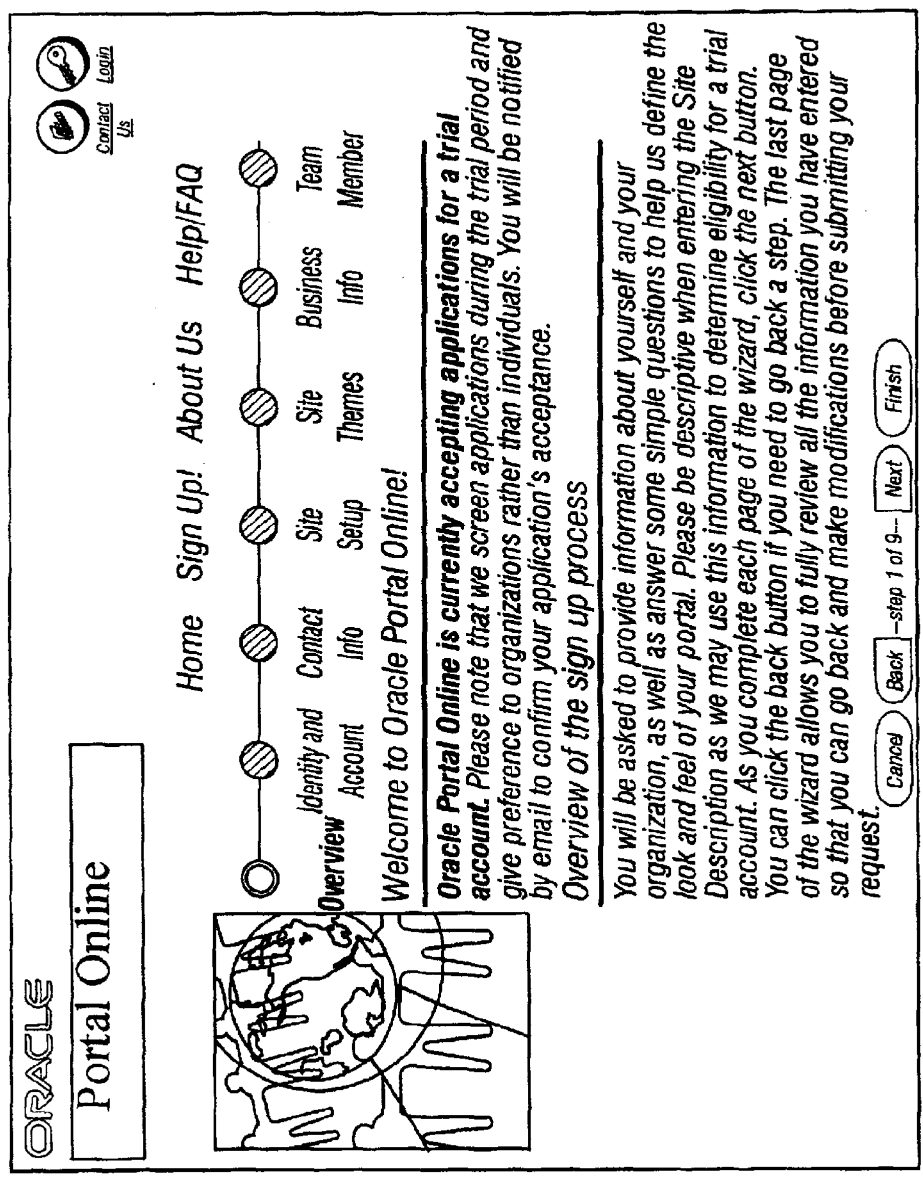

FIG. 4A shows a welcome screen that provides greeting messages and instructions for submitting preference data. The message displayed on the screen in FIG. 4A may be customized as desired. Each of the web pages depicted in FIGS. 4A–4I has a common navigation bar on the bottom of the screen. As shown in FIG. 4A, there are four options, namely, "cancel", "back", "next", and "finish." Not all options may be active on each screen. For example, in FIG. 4A, the "back" option is displayed in grey text, indicating that the option is not active, because there is no prior screen in the data collection process. Additionally, the "finish" option is displayed in grey text, indicating that this option is not active, because the data collection process is not yet complete. The "cancel" option is displayed in black text, indicating the option is active, because any action in the preference data collection process may be cancelled at any time. The "next" option is displayed in back text, indicating the option is active, because there is another screen in the data collection process.

FIG. 4B shows a second screen where identity information and administrator account information may be collected. As FIG. 4B graphically portrays, information about a user's identity may be collected, such as the user's first name, last name, employer, title, and email address. Information regarding the administration of the user's account may also be collected, such as, a security question and a corresponding security answer, which may be used to help authenticate the user at a later date. Also, additional information may be collected from the user such as an indicator if the user would like to receive informational email.

FIG. 4C shows a third screen where contact information and sponsor information may be collected. As FIG. 4C depicts, information about a user's mailing address may be collected, as well as other information such as sponsor information. Sponsor information identifies a sponsor or promotion the user wishes to use.

FIG. 4D shows a fourth screen where site setup information may be collected. As FIG. 4D visually illustrates, information about the portal web site may be collected, such as a portal web site title, a logo to use in the portal web site, and a description of the portal web site. Additional information used in the presentation of the portal web site may be collected as well, e.g., additional graphics, files to incorporate, or other portal web site default presentation characteristics.

Figure 4E:
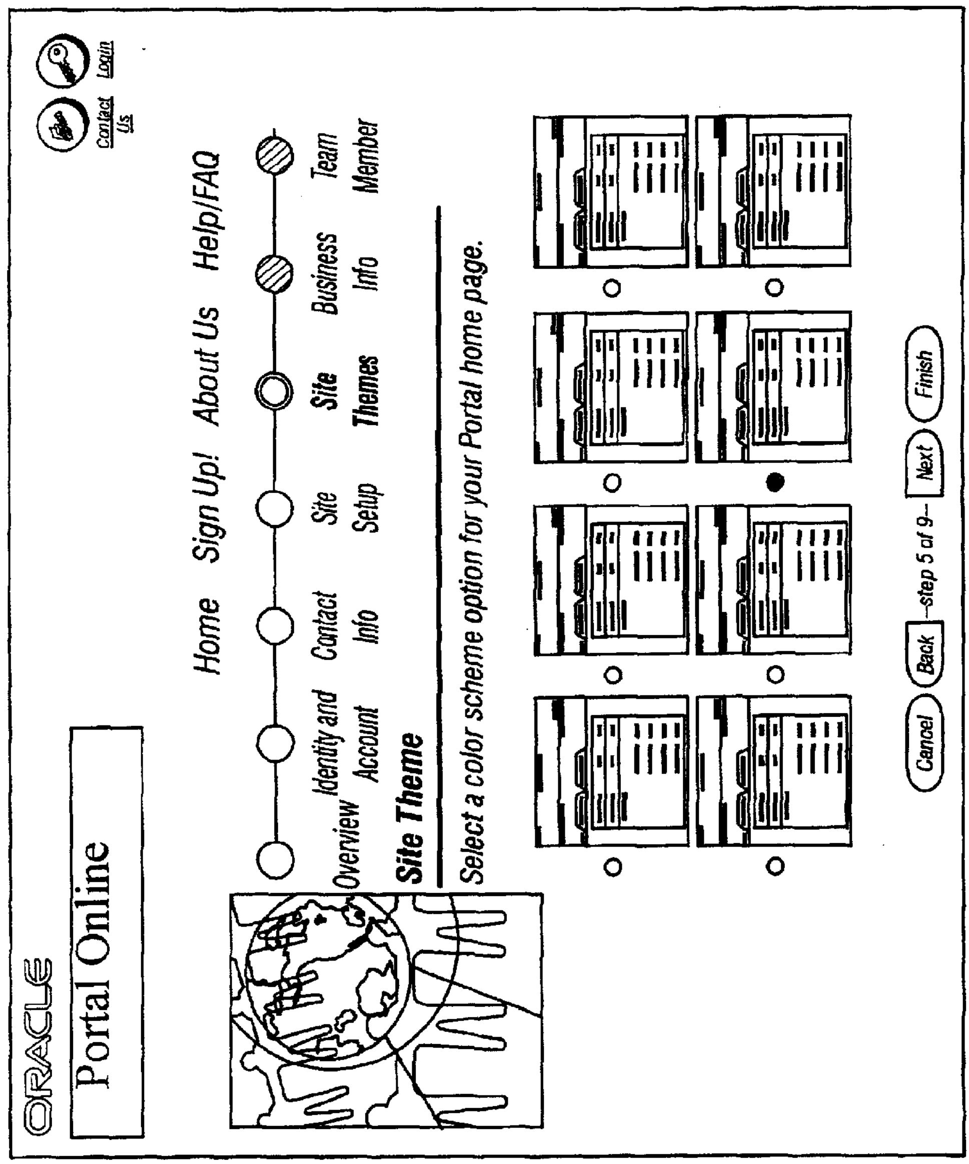

FIG. 4E shows a fifth screen where site theme information may be collected. A theme refers to a particular style of presenting information and content on the web page. For example, a theme may use a particular set of colors, fonts, and other visual components to display content in a particular manner. As shown in FIG. 4E, the user may be presented with a choice of different themes to select from. In addition, the user may modify the selected theme, or configure his or her own theme (not shown).

Figure 4F:
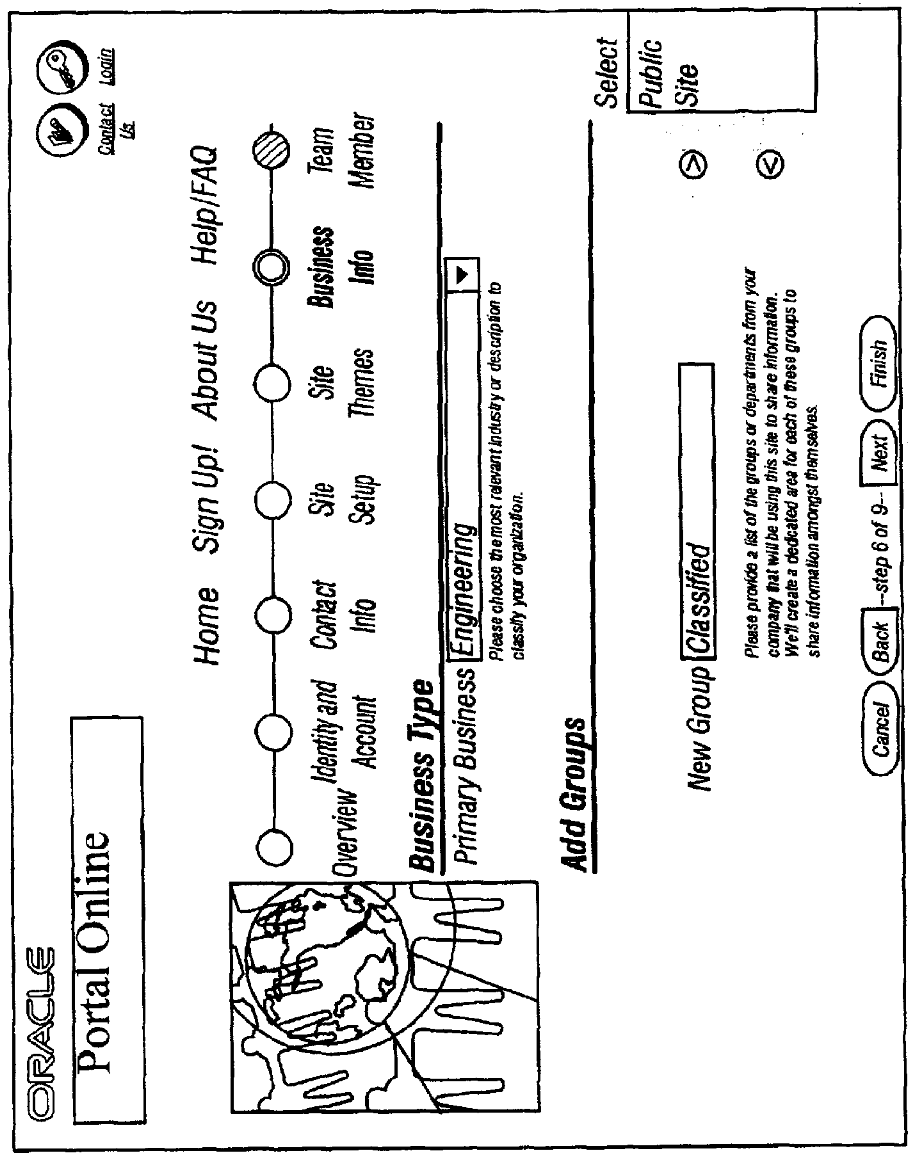

FIG. 4F shows a sixth screen where business type information and group information may be collected. Business type information identifies the most relevant industry type to the business the portal web site being configured will be used in, e.g., engineering, legal, or manufacturing. Business types may be divided into numerous levels of granularity, e.g., a particular embodiment may have 30 sub-types under the business type of "engineering." Business types, and any sub-types, may be used by the portal web site development system 100 to tailor and customize the presentation of the portal web site. For example, a portal web site with a business type of "engineering" may be rendered using default themes, layouts, and portlets that are useful or appealing to that business segment. Group information identifies a list of groups to be associated with the portal web site. A group is a unit or department in an organization that will use the portal web site for a common task. Each group in a portal web site may be assigned a common area where each user in the group may share information among themselves.

Figure 4G:
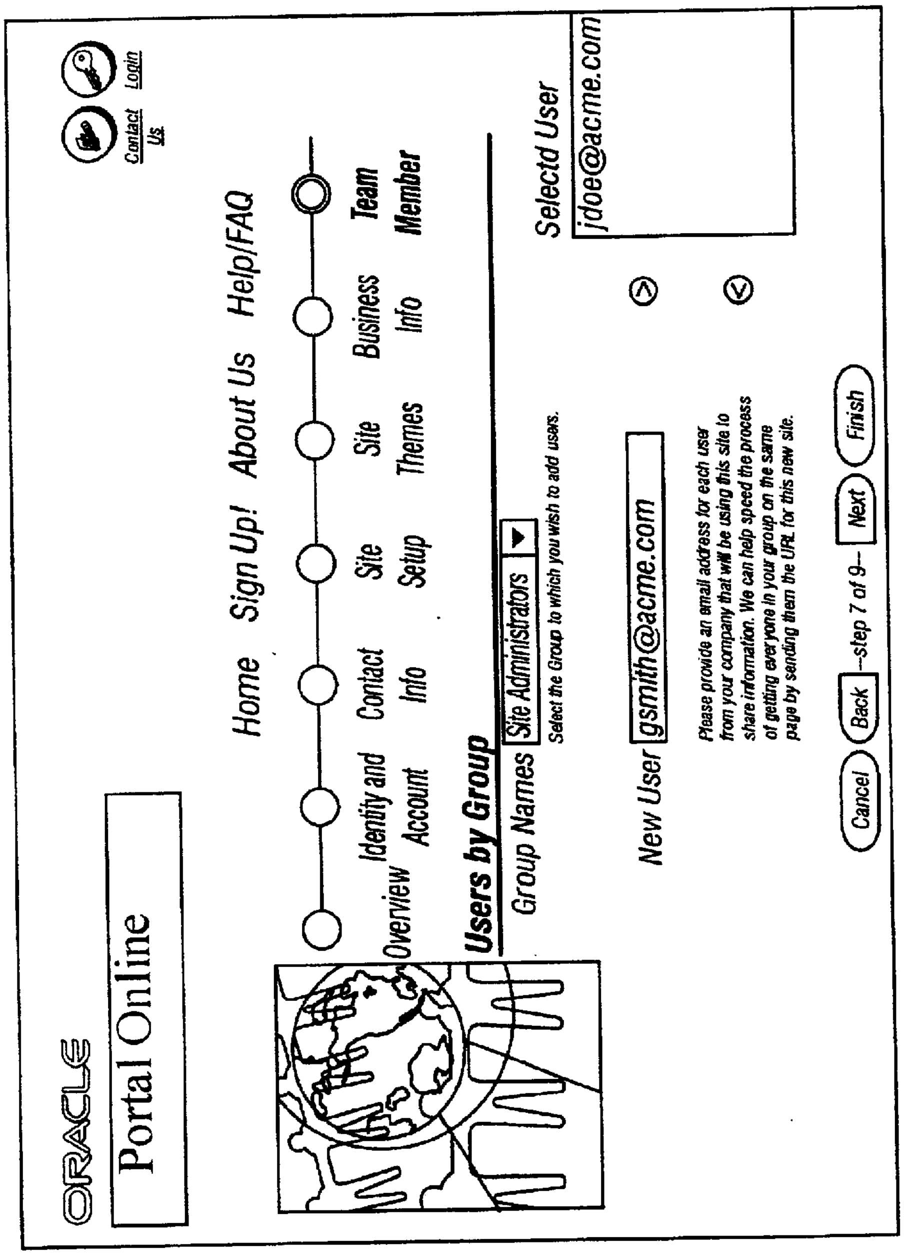

FIG. 4G shows a seventh screen where users by group information may be collected. As FIG. 4G visually portrays, the users may be added to individual groups by selecting a particular group, and subsequently entering in the email address of a user to add to that group.

Figure 4H:
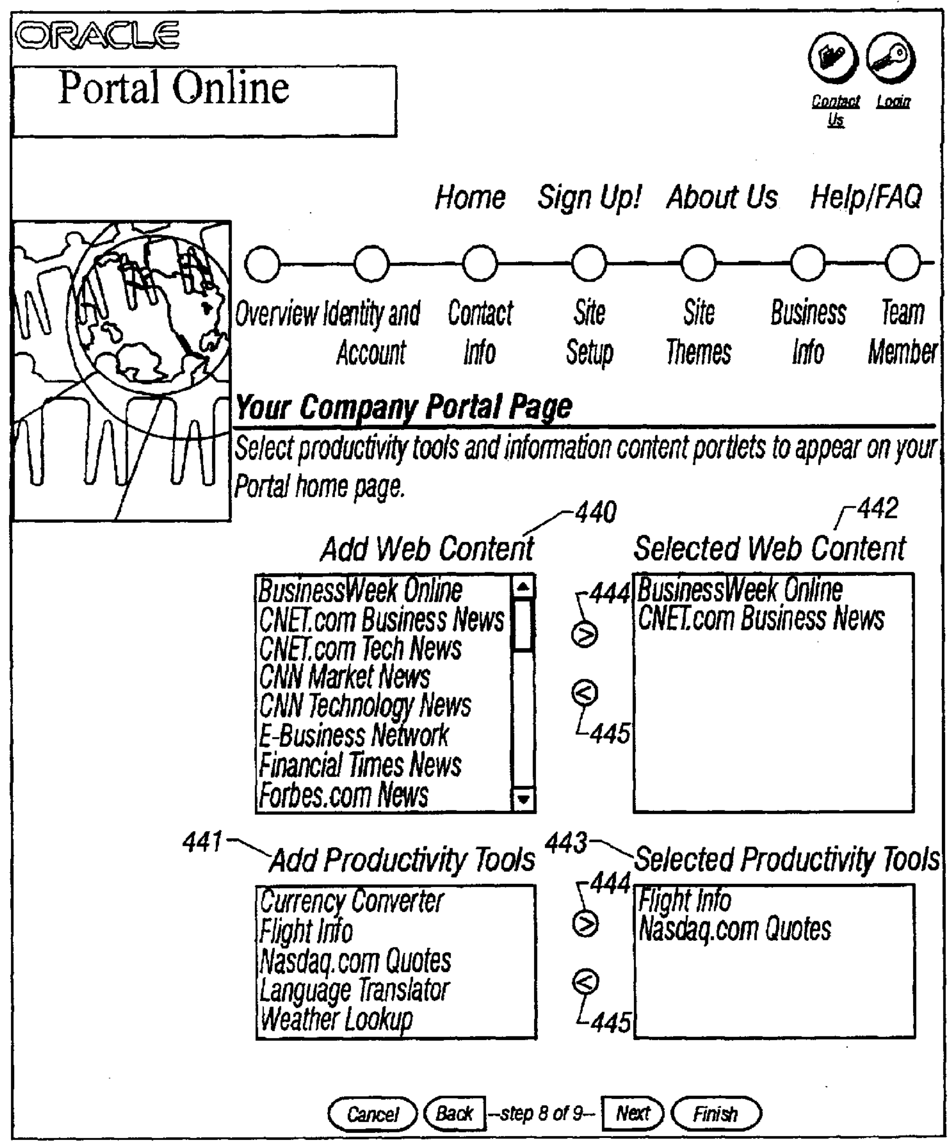

FIG. 4H shows an eighth screen where information regarding the set of portlets to include on the portal web site may be collected. In FIG. 4H, users may select particular portlets to add to their portal web site. As shown in FIG. 4H, there are two different lists of portlets users may select from, namely, those that provide content (listed under "add web content 440"), and those that offer functionality (listed under "add productivity tools 441"). Once a portlet is selected, it will appear in a corresponding list on the right, namely under the title "selected web content 442" or "selected productivity tools 443." Portlets are selected by highlighting a portlet and pressing the greater-than sign 444; portlets are deselected by highlighting a portlet and pressing the less-than sign 445.

Figure 4I:
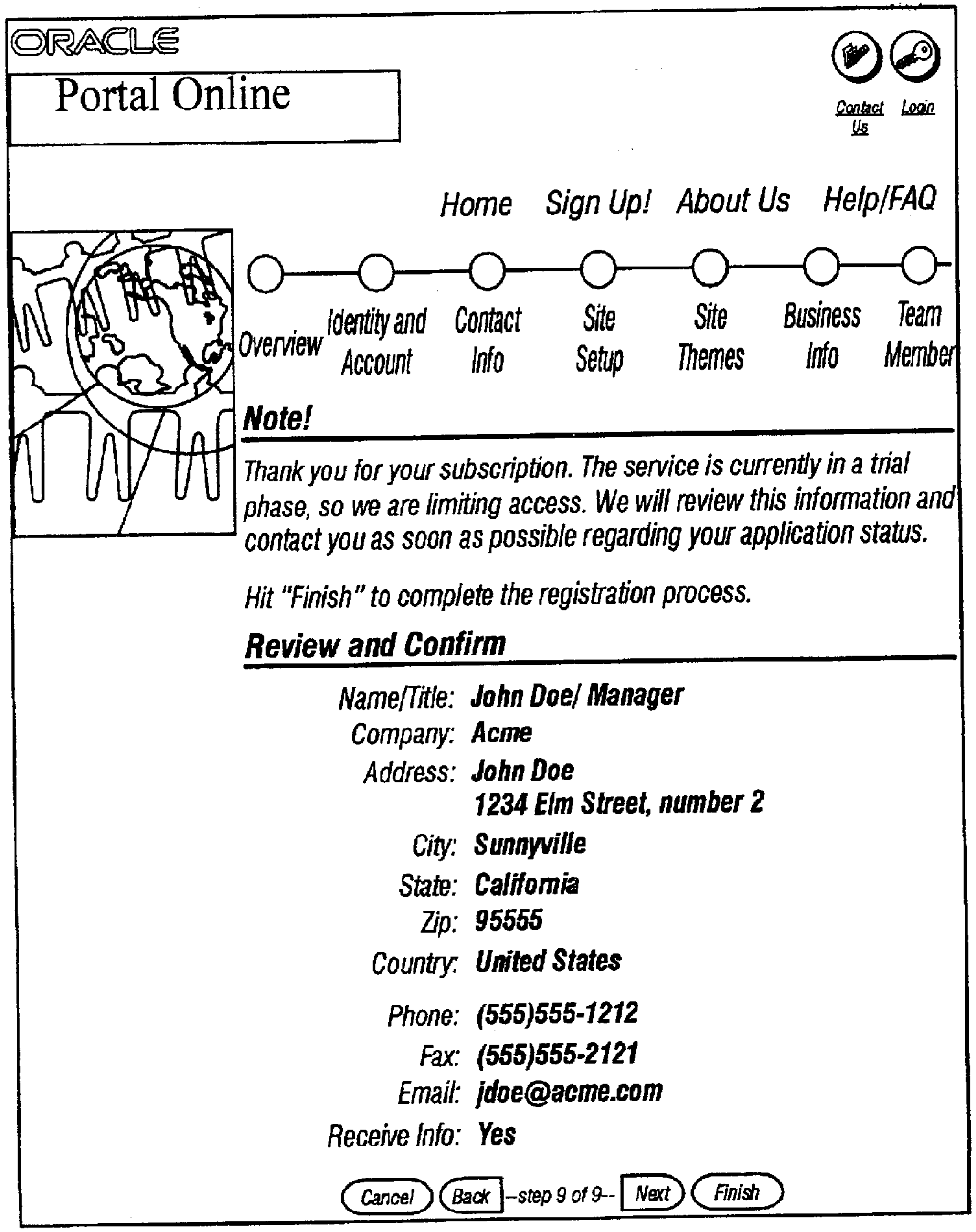

FIG. 4I shows a ninth screen where a review and confirmation may be presented to the user. In FIG. 4I, customized text may appear to the user to confirm that the values entered by the user are correct. Additional instruction may also appear to the user on this screen as well.

FIGS. 4A–4I are illustrations of collecting preference data through a graphical user interface according to one embodiment of the invention. It is contemplated by the inventors of the present invention that preference data may include different data than those presented with reference to FIGS. 4A–4I. In other words, preference data that differs from that depicted in FIGS. 4A–4I may be collected without departing from the spirit and scope of the invention. It is further contemplated by the inventors that various graphical user interfaces may be used to collect the same set of preference data. Accordingly, graphical user interfaces of FIGS. 4A–4I are non-limiting examples nd the present invention is not limited to any specific composition of preference data or any specific arrangement and composition of graphical user interfaces to collect the preference data.

Once collected, the preference data may be stored in a variety of well understood means which enable subsequent retrieval of the preference data, such as, computer memory, a database 140, or a file. In embodiments of the invention, the collected preference data is stored in a portal database 140; such embodiments may be advantageous if a portal web site is not generated contemporaneously with collecting preference data.

After the preference data is collected, the next step according to an embodiment is to generate a portal web site based upon the preference data 220. Note that the step of collecting preference data 210 and generating a portal web site 220 need not occur contemporaneously if the preference data is stored. Various embodiments of the invention advantageously store preference data to allow background checks, inter alia, to be performed on the user submitting the preference data in the interim before the portal web site is generated. This feature allows the portal web site development system 100 to filter out undesirable preference data from being generated into portal web sites. The portal web server 150 may be configured such that this filtration step is automatically performed based upon a rulebase. In embodiments of the invention, the portal web server 150 may be configured such that portal web sites are generated at preset time intervals as well as upon command. In step 220, the preference data collected in step 210 is processed such that a new portal web site is generated with the characteristics in the preference data. Step 220 will be discussed in further detail below.

The process of generating a portal web site in step 220 is performed within the portal database 140. The portal web site is generated by storing information in the portal schema residing with the portal database 140, which may be subsequently used to render the portal web site. In embodiments of the invention, information is stored in the portal schema by (a) making a copy of the set of seed data in the portal schema, (b) assigning and storing a subscriber id 301 with the copied seed data, and (c) modifying the copied seed data where it differs from the preference data. This process will be explained in further detail below with reference to FIGS. 3A–3C.

FIG. 3A is an illustrative portal schema table 300 having a first row 305 and a second row 310, wherein the seed data is in the first row 305. The seed data is associated with a subscriber id 301, which has a value of 1020 in the example given in FIG. 3A. Row 305 contains further seed data, namely the administrator first name 302, administrator last name 303, and administrator email address 304.

In FIG. 3B, which illustrates the same portal schema table 300 as in FIG. 3A, the seed data 300 has been copied in a new row 310 in the portal schema table with a new unique subscriber id 301 with a value of 2000. The value for the subscriber id 301 should be updated such that it is a unique value in the newly added row 310 because each set of data identifying the appearance and operation of a portal web site must be unique for all the data of the portal web site to be identified. In embodiments of the invention, this restraint is also used to restrict user access such that a user may only access data in the portal schema pertinent to the user's portal web site.

In FIG. 3C, which illustrates the same portal schema table 300 as in FIGS. 3A–B, the seed data in row 310 has been modified where appropriate to store the preference data. Specifically, the seed data in columns 320, 322, and 323 were modified because the preference data differed from the corresponding seed data; however, the preference data in column 321 did not change because it did not differ from the corresponding seed data 300 because the first name of the administrator identified in the preference data is also "John." This approach is advantageous because the seed data 300 already contains default information regarding the appearance and operation of a portal web site, which minimizes updating the data in the portal schema. In particular, the seed data may contain preexisting relationships in the portal schema, such as, e.g., foreign key relationships, which will be preserved in copying the seed data. Alternatively, the preference data may be stored in the portal schema without the aid of seed data using techniques well known to those in the art. The process illustrated in FIGS. 3A–C may be applied to a number of database tables of greater complexity to accommodate any variety of preference data.

Figure 5:
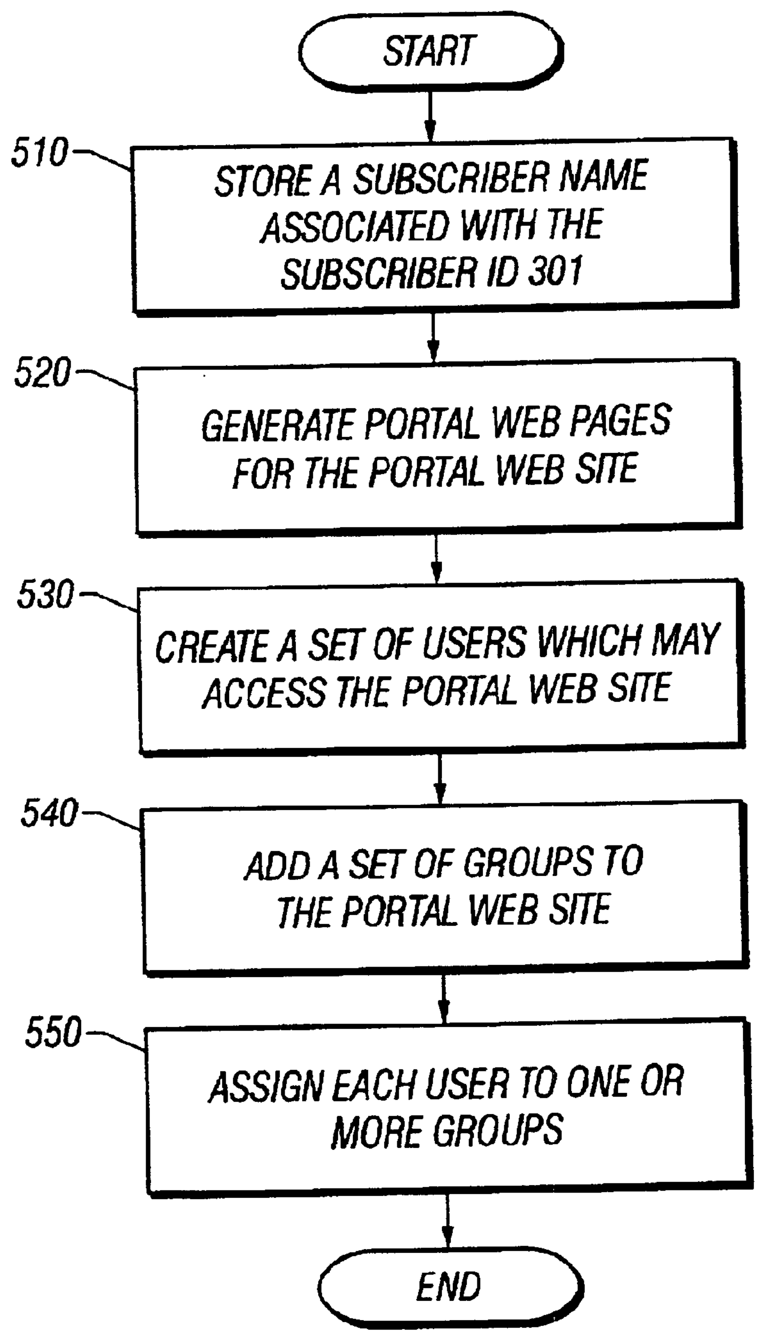
FIG. 5 is a flowchart illustrating the functional steps of generating a portal web site 220 according to an embodiment of the invention.

The functional steps of generating a portal web site 220 according to an embodiment of the invention will now be described with reference to FIG. 5, which is a flowchart illustrating the same. The sequences of steps of FIG. 5 may be performed by executing any set of stored instructions accessible by the portal database 140. For example, an API or a stored procedure may be called to perform a particular step discussed in reference to FIG. 5.

In an embodiment, the first step in generating a portal web site is to store a subscriber name associated with the subscriber id 301 in the portal schema 510. The subscriber name is the name associated with the portal web site, such as, e.g., a company name.

Figure 6:
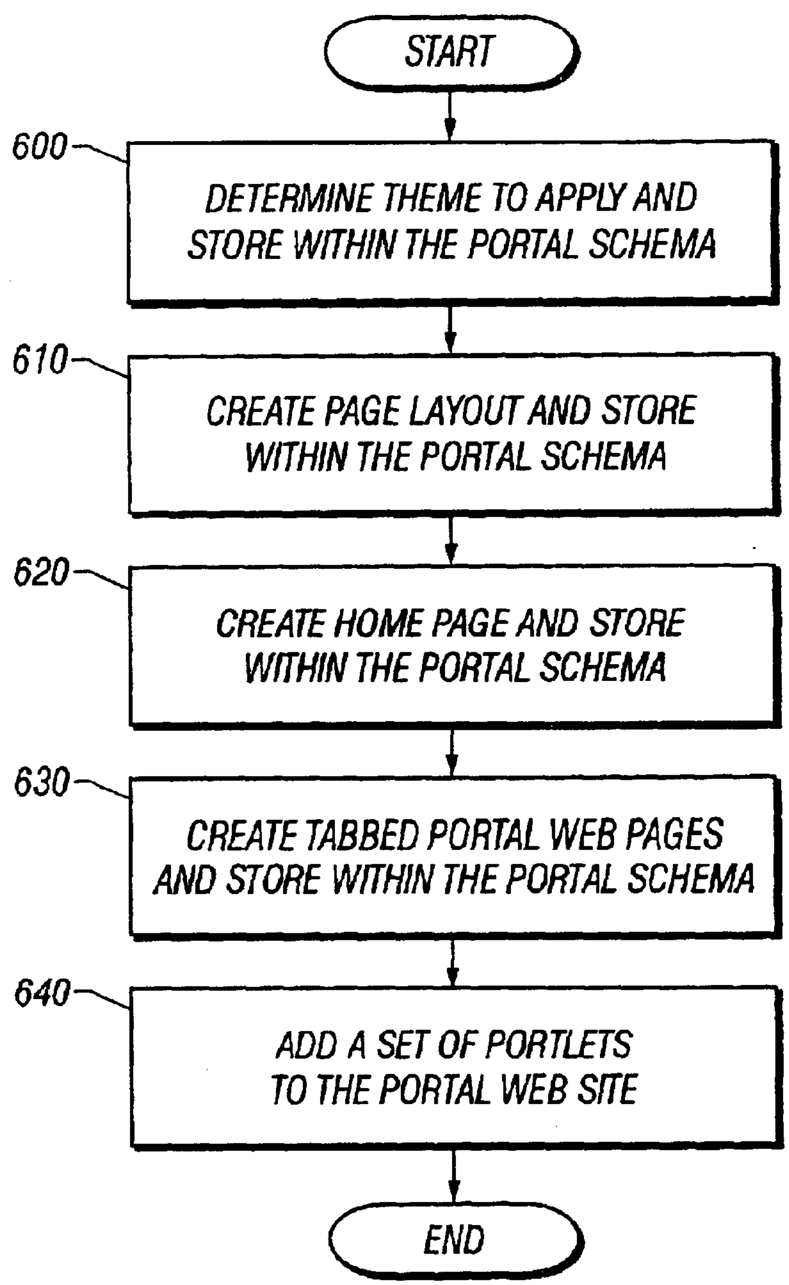
FIG. 6 is a flowchart illustrating the functional steps of generating the portal web pages comprising the portal web site 520 according to an embodiment of the invention.

In an embodiment, the next step is to generate the portal web pages for the portal web site 520 using data resident in the preference data. The step of generating the portal web pages comprising the portal web site 520 itself contains a plurality of steps, which will be explained with reference to FIG. 6, which is a flowchart illustrating the functional steps of generating the portal web pages comprising the portal web site 520 according to an embodiment of the invention. According to an embodiment, initially the theme to be applied to the portal web pages is determined and stored 600 in the portal schema. The theme to be applied may be found by referring to the preference data or by referring to a default theme. Next, a page layout is created and stored in the portal schema 610. A page layout refers to a particular arrangement of web content on a portal web page. The page layout to be applied may be found by referring to the preference data or by deferring to a default page layout. Subsequently, the home page for the portal web site is created and stored in the portal schema 620. A home page, as widely understood in the art, is the main page for a web site or portal web site. The home page is created by applying the theme and page layout information stored previously, as well as applying any additional rules defined in the portal database 140. The home page is subsequently stored in the portal schema.

Figure 7:
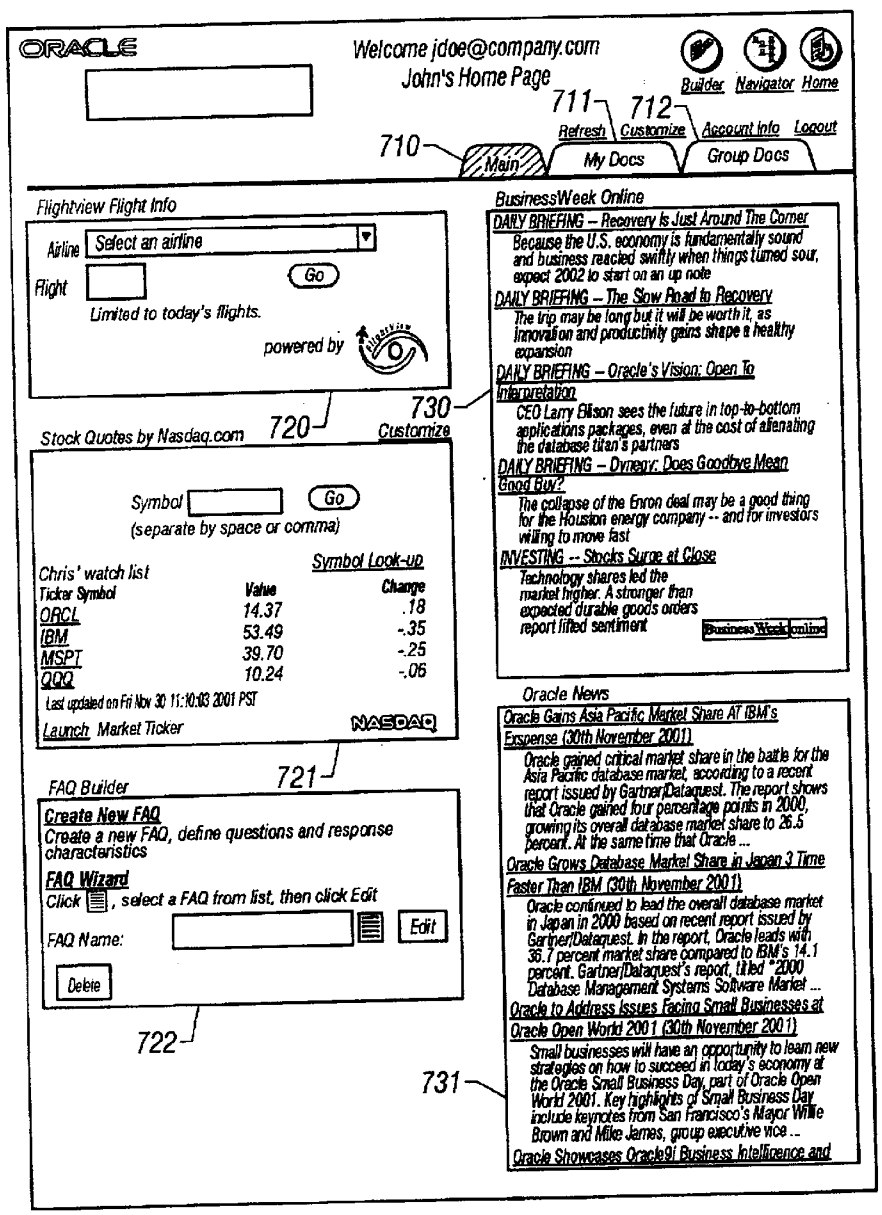
FIG. 7 is a pictorial representation of a home page of a portal web site according to an embodiment of the invention.

In an embodiment, the next step is to create a set of tabbed portal web pages that appear on the home page and store them within the portal schema 630. A tabbed web page is any web page that may be accessed by selecting a tab on a web page. In other words, by selecting one of the tabs on the home page, a user may display a tabbed web page. An illustration of a tabbed web page is portrayed in FIG. 7 as a pictorial representation of a home page of a portal web site according to an embodiment of the invention. In FIG. 7, there are three tabbed web pages 710, 711, and 712. The set of tabbed portal web pages to be added may be identified by referring to the preference data or by referring to a default set of tabbed portal web pages. In an embodiment of the invention, the set of tabbed portal web pages added includes a “Main” portal web page 710, a “My Docs” portal web page 712, and a “Group Docs” portal web page 713. The tabbed portal web pages provide a way to logically present and arrange web content on separate pages. The web content appearing on a tabbed portal web page is arbitrary, although related web content generally appears on the same tabbed portal web page. Tabbed portal web pages may be shared between users. For example, according to an embodiment of the invention, the “Group Docs” tabbed web page 712 may be shared between all the users of a portal web site such that each user will be presented the same web content under that tab. Such a tabbed portal web page would advantageously provide for sharing information between users. Other tabbed portal web pages may contain web content that is only visible to a particular user. For example, in an embodiment, the “My Docs” tabbed portal web page 711 displays web content that is not shared among users. In an embodiment, by selecting the “Main” tab 710, the home page is displayed.

In an embodiment, after the tabbed portal web pages are created and stored within the portal schema, a set of portlets are added to the portal web site 640. The set of portlets to add to the portal web site may be obtained by referring to the preference data. Alternately, one or more default portlets may be added as well. Preferences may be encoded in the preference data regarding where each portlet should reside in the portal web page. Alternatively, a default layout of portlets may be used. For example, in an embodiment of the invention, portlets categorized as productivity tools reside on the left of the home page, whereas portlets categorized as web content portlets reside on the left of the home page. Portlets may appear on any portal web page in the portal web site. For example, FIG. 7 depicts portlets 720, 721, 722, 730, and 731 on a home page according to an embodiment of the invention. In the embodiment depicted in FIG. 7, productivity tool portlets 720, 721, and 722 are displayed on the left, and web content portlets 730 and 731 are displayed on the right.

Data identifying the members of the set of portlets to add, as well as their location and other specific characteristics, is stored within the portal schema. Examples of other specific characteristics which may be stored include configuration details about specific portlets, such as particular stocks to track for a stock market portlet and a particular city to monitor for a weather portlet.

After the portal web site is generated in step 520, a set of users which may access the portal web site are created 530. The set of users which may access the portal web site may be identified by information in the preference data. Each user may be assigned a default username and password with which to access the portal web site. Alternatively, the username or password of the user may be specified in the preference data. The username and password is stored in the database of the login server 130. The login server 130 will access the stored username and password of each user when authenticating the user.

In an embodiment, once a set of authorized users are added to the portal web site in step 530, a set of groups may be added to the portal web site 540. The set of groups to be added may be determined by referencing the preference data. In addition, zero or more default groups may be added as well.

According to an embodiment, after the set of groups are added to the portal web site, the set of users which may access the portal web site may be assigned to one or more groups 550. Users may be added to groups identified in the preference data. Alternately, users may also be added to one or more default groups. After each authorized user is associated with one or more groups, folders are created and added to the portal web site 560. Folders for each user may be added to the home page or particular tabbed portal web pages. For example, folders for each user may be added to the “My Docs” tabbed portal page. Additionally, folders for each group may be added to the home page or particular tabbed portal web pages. For example, folders for each group may be added to the “Group Docs” tabbed portal page.

When a folder is added, the folder is associated with a user or a group. Permissions are set on the folder such that only the user or group associated with the folder may view the folder. For example, if a folder is associated with a group “development,” then only users who belong to the “development” group may view the folder. In another example, if a folder is associated with a particular user, then only that user may view the folder. Permissions may be set on web content other than folders in the portal web site in this manner. In other words, the viewing privileges on web content, e.g., a file, may be limited to an associated user or a group.

The sequence of steps discussed above with reference to FIG. 5 and FIG. 6 may be performed in different orders. For example, step 530 may be performed before or contemporaneously with step 520. In various embodiments, it may be desirable to perform the steps depicted in FIG. 5 or in FIG. 6 in a different order, or in parallel, for performance reasons. As such, the invention is not limited by any particular sequence of steps in generating the portal web site.

Subsequent to the portal web site creation in step 220, notification is transmitted to the administrator of the portal web site that the portal web site has been generated 230. The notification may be sent by means identified in the preference data, including, e.g., a pager message, a facsimile, or an email. The notification contains directions on how to access the portal web site. For example, the notification may contain information about how to log in to the portal web site, what users are registered to access the portal web site, and what groups exist on the portal web site.

Deployment Considerations

The execution of the sequences of instructions required to practice the invention may be performed in embodiments of the invention by a computer system 800. In an embodiment of the invention, execution of the sequences of instructions required to practice the invention is performed by a single computer system 800. According to other embodiments of the invention, two or more computer systems 800 coupled by a communication link 815 may perform the sequence of instructions required to practice the invention in coordination with one another. In order to avoid needlessly obscuring the invention, a description of only one computer system 800 will be presented below; however, it should be understood that any number of computer systems 800 may be employed to practice the invention.

Figure 8:
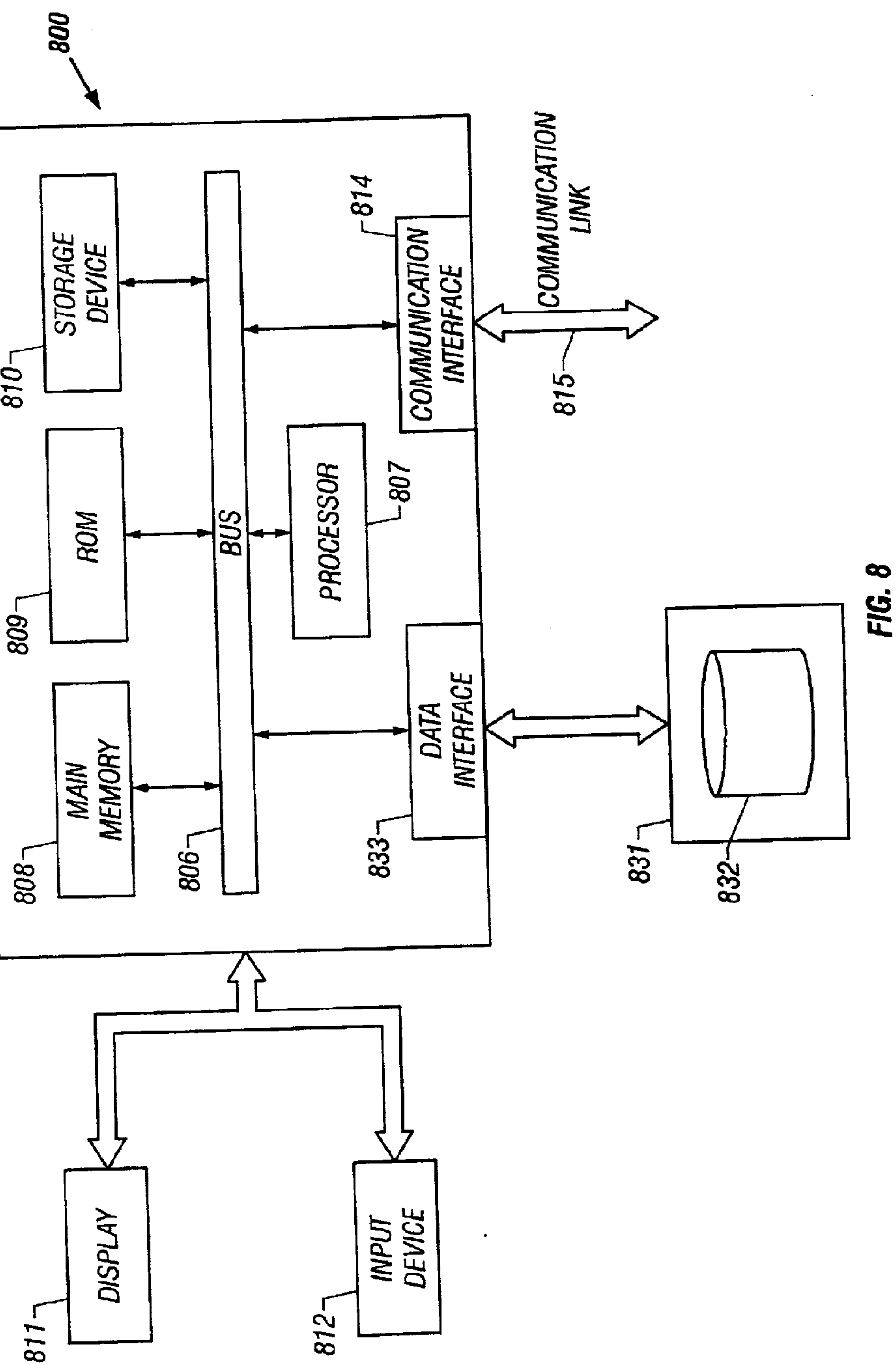
FIG. 8 is a block diagram of the functional components of a computer system 800 according to an embodiment of the invention.

A computer system 800 according to an embodiment of the invention will now be described with reference to FIG. 8, which is a block diagram of the functional components of a computer system 800 according to an embodiment of the invention. As used herein, the term computer system 800 is broadly used to describe any computing device that can store and independently run one or more programs.

Each computer system 800 may include a communication interface 814 coupled to the bus 806. The communication interface 814 provides two-way communication between computer systems 800. The communication interface 814 of a respective computer system 800 transmits and receives electrical, electromagnetic or optical signals, that include data streams representing various types of signal information, e.g., instructions, messages and data. A communication link 815 links one computer system 800 with another computer system 800. For example, the communication link 815 may be a LAN, in which case the communication interface 814 may be a LAN card, or the communication link 815 may be a PSTN, in which case the communication interface 814 may be an integrated services digital network (ISDN) card or a modem.

A computer system 800 may transmit and receive messages, data, and instructions, including program, i.e., application, code, through its respective communication link 815 and communication interface 814. Received program code may be executed by the respective processor(s) 807 as it is received, and/or stored in the storage device 810, or other associated non-volatile media, for later execution.

In an embodiment, the computer system 800 operates in conjunction with a data storage system 831, e.g., a data storage system 831 that contains a database 832 that is readily accessible by the computer system 800. The computer system 800 communicates with the data storage system 831 through a data interface 833. A data interface 833, which is coupled to the bus 806, transmits and receives electrical, electromagnetic or optical signals, that include data streams representing various types of signal information, e.g., instructions, messages and data. In embodiments of the invention, the functions of the data interface 833 may be performed by the communication interface 814.

Computer system 800 includes a bus 806 or other communication mechanism for communicating instructions, messages and data, collectively, information, and one or more processors 807 coupled with the bus 806 for processing information. Computer system 800 also includes a main memory 808, such as a random access memory (RAM) or other dynamic storage device, coupled to the bus 406 for storing dynamic data and instructions to be executed by the processor(s) 807. The main memory 808 also may be used for storing temporary data, i.e., variables, or other intermediate information during execution of instructions by the processor(s) 807.

The computer system 400 may further include a read only memory (ROM) 809 or other static storage device coupled to the bus 806 for storing static data and instructions for the processor(s) 807. A storage device 810, such as a magnetic disk or optical disk, may also be provided and coupled to the bus 806 for storing data and instructions for the processor(s) 807.

A computer system 800 may be coupled via the bus 806 to a display device 811, such as, but not limited to, a cathode ray tube (CRT), for displaying information to a user. An input device 812, e.g., alphanumeric and other keys, is coupled to the bus 806 for communicating information and command selections to the processor(s) 807.

According to one embodiment of the invention, an individual computer system 800 performs specific operations by their respective processor(s) 807 executing one or more sequences of one or more instructions contained in the main memory 808. Such instructions may be read into the main memory 808 from another computer-usable medium, such as the ROM 809 or the storage device 810. Execution of the sequences of instructions contained in the main memory 808 causes the processor(s) 807 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 807. Such a medium may take many forms, including, but not limited to, non-volatile, volatile and transmission media. Non-volatile, media, i.e., media that can retain information in the absence of power, includes the ROM 809, CD ROM, magnetic tape, and magnetic discs. Volatile media, i.e., media that can not retain information in the absence of power, includes the main memory 808. Transmission media includes coaxial cables, copper wire and fiber optics, including the wires that comprise the bus 806. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

What is claimed is:

1. A method for creating a portal web site, comprising:

storing seed data within a database, the seed data identifying an initial appearance and operation of the portal web site;

collecting preference data from a user of the portal web site, the preference data identifying a set of user preferences about the appearance and operation of the portal web site;

storing the preference data within a database; and generating the portal web site based upon the preference data.

2. The method of claim 1, wherein the step of storing the preference data includes the steps of:

making a copy of the seed data stored in the database; and modifying the copied seed data to reflect the user preferences.

3. The method of claim 1, wherein the step of generating the portal web site is performed entirely within the database.

4. The method of claim 1, wherein the step of generating the portal web site comprises creating one or more users based upon the preference data, wherein each user may access the portal web site.

5. The method of claim 4, wherein the step of generating the portal web site comprises generating a set of groups based upon the preference data, wherein the set of groups may comprise one or more users, and each group may be configured such that the one or more users within the group may have a permission to access a portion of the web site.

6. The method of claim 5, wherein each group may have a different permission to access a different portion of the portal web site.

7. The method of claim 1, further comprising:

transmitting an email to a user to indicate that the step of generating the portal web site is complete.

8. The method of claim 1, wherein the preference data comprises data identifying a set of portlets to appear on the portal web site.

9. The method of claim 1, wherein the step of generating the portal web site is performed by storing data in a portal schema, wherein the portal schema contains data comprising two or more portal web sites.

10. A computer-readable medium carrying one or more sequences of instructions for creating a portal web site, wherein executing of the one or more sequences of instructions by one or more processors causes the one or more processors to perform the steps of:

storing seed data within a database, the seed data identifying an initial appearance and operation of the portal web site;

collecting preference data from a user of the portal web site, the preference data identifying a set of user preferences about the appearance and operation of the portal web site;

storing the preference data within a database; and generating the portal web site based upon the preference data.

11. The computer-readable medium of claim 10, wherein the step of storing the preference data includes the steps of:

making a copy of the seed data stored in the database; and modifying the copied seed data to reflect the user preferences.

12. The computer-readable medium of claim 10, wherein the step of generating the portal web site is performed entirely within the database.

13. The computer-readable medium of claim 10, wherein the step of generating the portal web site comprises creating one or more users based upon the preference data, wherein each user may access the portal web site.

14. The computer-readable medium of claim 13, wherein the step of generating the portal web site comprises generating a set of groups based upon the preference data, wherein the set of groups may comprise one or more users, and each group may be configured such that the one or more users within the group may have a permission to access a portion of the web site.

15. The computer-readable medium of claim 14, wherein each group may have a different permission to access a different portion of the portal web site.

16. The computer-readable medium of claim 10, further comprising:

transmitting an email to a user to indicate that the step of generating the portal web site is complete.

17. The computer-readable medium of claim 10, wherein the preference data comprises data identifying a set of portlets to appear on the portal web site.

18. The computer-readable medium of claim 10, wherein the step of generating the portal web site is performed by storing data in a portal schema, wherein the portal schema contains data comprising two or more portal web sites.

19. A system for creating a portal web site, comprising:

logic to store seed data within a database, the seed data identifying an initial appearance and operation of the portal web site;

logic to collect preference data from a user of the portal web site, the preference data identifying a set of user preferences about the appearance and operation of the portal web site;

logic to store the preference data within a database; and logic to generate the portal web site based upon the preference data.

20. The system of claim 19, wherein the logic to store the preference data includes:

logic to make a copy of the seed data stored in the database; and logic to modify the copied seed data to reflect the user preferences.

21. The system of claim 19, wherein the logic to generate the portal web site comprises logic to create one or more users based upon the preference data, wherein each user may access the portal web site.

22. The system of claim 21, wherein the logic to generate the portal web site comprises logic to generate a set of groups based upon the preference data, wherein the set of groups may comprise one or more users, and each group may be configured such that the one or more users within the group may have a permission to access a portion of the web site.

23. The system of claim 22, wherein each group may have a different permission to access a different portion of the portal web site.

24. The system of claim 19, further comprising:

logic to transmit an email to a user to indicate that the generating the portal web site is complete.

25. The system of claim 19, wherein the preference data comprises data identifying a set of portlets to appear on the portal web site.

26. The system of claim 19, wherein the logic to generate the portal web site includes logic to store data in a portal schema, wherein the portal schema contains data comprising two or more portal web sites.

* * * * *